(12) United States Patent
Avadhuta

(10) Patent No.: US 10,288,034 B2
(45) Date of Patent: May 14, 2019

(54) APPARATUS FOR POWER GENERATION FROM THE SURFACE OCEAN WAVES IN DEEP SEAS

(71) Applicant: Pruthvi Raj Avadhuta, Hyderabad (IN)

(72) Inventor: Pruthvi Raj Avadhuta, Hyderabad (IN)

(73) Assignee: Pruthvi Raj Avadhuta, 2nd Villa, Behind Bharat Petrol, Vinayaka Nagar, Hafeezpet, Hyderabad, Telangana (IN)

( * ) Notice: Subject to any disclaimer, the term of this patent is extended or adjusted under 35 U.S.C. 154(b) by 0 days.

(21) Appl. No.: 15/557,473

(22) PCT Filed: Nov. 17, 2016

(86) PCT No.: PCT/IB2016/056908
§ 371 (c)(1),
(2) Date: Sep. 12, 2017

(87) PCT Pub. No.: WO2017/085647
PCT Pub. Date: May 26, 2017

(65) Prior Publication Data
US 2018/0245563 A1 Aug. 30, 2018

(30) Foreign Application Priority Data
Nov. 18, 2015 (IN) .............................. 623/CHE/2015

(51) Int. Cl.
*F03B 13/18* (2006.01)
*F04D 25/04* (2006.01)
*F04D 17/10* (2006.01)

(52) U.S. Cl.
CPC ............ *F03B 13/186* (2013.01); *F04D 17/10* (2013.01); *F04D 25/04* (2013.01); *F05B 2240/40* (2013.01); *Y02E 10/38* (2013.01)

(58) Field of Classification Search
CPC ........ F03B 13/186; F04D 25/04; F04D 17/10; Y02E 10/38; F05B 2240/40
USPC ................................ 60/495–507; 290/42, 53
See application file for complete search history.

(56) References Cited

U.S. PATENT DOCUMENTS

| 3,595,189 | A | * | 7/1971 | McLean | .............. B63B 35/4413 114/183 A |
| 3,911,287 | A | * | 10/1975 | Neville | ................ F03B 13/1815 290/53 |
| 3,961,479 | A | * | 6/1976 | Anderson | ............. F03B 17/025 60/496 |

(Continued)

Primary Examiner — Hoang Nguyen (57) ABSTRACT

Exemplary embodiments of the present disclosure are directed towards an apparatus for power generation from the surface ocean waves in deep seas and methods thereof. Wave energy moves a float, vertically up and down, within the confines of four vertical pillars that are fixed to a buoyant tank. This buoyant tank is placed deep below the ocean surface and the upper surface of the float connects to a rack and pinion system which is coupled to a gearbox. Within the gearbox are freewheels and gears, that drive a generator shaft, in one direction only, as the float oscillates up and down on the ocean waves. For generating large amounts of power, a number of units are placed in a row. Many rows are placed side by side and the mechanical energy of all the rows is transferred to a long horizontal shaft which drives a generator through a gear box.

10 Claims, 9 Drawing Sheets

(56) References Cited

U.S. PATENT DOCUMENTS

| | | | | |
|---|---|---|---|---|
| 6,930,406 B2* | 8/2005 | Montgomery | ...... | F03B 13/1845 290/42 |
| 7,862,292 B2* | 1/2011 | Patterson | ............ | F03B 13/1865 415/123 |
| 7,980,832 B2* | 7/2011 | Ahdoot | ................ | F03B 13/182 290/42 |
| 2009/0309366 A1* | 12/2009 | Moore | .................... | B63B 35/44 290/53 |
| 2010/0244451 A1* | 9/2010 | Ahdoot | ................ | F03B 13/186 290/53 |

* cited by examiner

APPARATUS FOR POWER GENERATION FROM THE SURFACE OCEAN WAVES IN DEEP SEAS

TECHNICAL FIELD

The present disclosure generally relates to the field of power generation. More particularly, the present disclosure relates to novel systems and methods for converting the Kinetic Energy present in the Ocean Waves into a rotational movement for generating electricity.

BACKGROUND

There have been concerns regarding the limited resources of the conventional combustible hydrocarbon fuel sources and the damaging emissions that result from their use. This has prompted a great deal of research work into the use of sustainable, non-polluting energy sources such as Wind, Tides/Waves, Geothermal, Solar etc.

Ocean Wave Energy is a very concentrated and also a consistent source of renewable energy. When compared to the conventional fossil fuels, Ocean Wave Energy offers the double benefits of near limitless free supply and also a total lack of environmentally polluting emissions.

Although the total amount of Ocean Wave Energy in the Ocean Waves is of immense proportions, the Wave energy tapped by certain installed Wave Energy units of different technologies, is very limited. It is said that Ocean Wave Energy present in an area of 10 miles×10 miles, if tapped, could power the entire state of California. A 4 foot, 10 second wave has 35,000 hp or more than 26 MWs per mile of the coast.

In this invention, Ocean Wave energy is tapped from the surface Waves of the deep seas of over 60 feet in depth, far away from the shore. The Wave Energy units Float in the sea and tap the kinetic energy of the waves.

A number of different types of power generating systems have been proposed for commercial electrical power generation.

There are three basic systems for wave energy conversion. a) Surge or focussing devices that channel the Ocean Waves into Reservoirs. b) Surface followers that use floats or pitching devices that drive hydraulic pumps and c) Oscillating water column systems that use the waves to compress the air within a container.

The mechanical power created from these systems either directly runs a generator or transfers their energy to air or to any working fluid such as Water or Oil that runs a Turbine and a Generator. The main deficiencies with wave driven air Turbine systems, is the restricted overall achievable energy efficiencies. This is primarily due to the limitations, firstly in the means of focusing the wave energy to maximize the wave displacement amplitude and secondly a deficiency or deficiencies inherent in the turbine designs. The compressibility ratio between sea water and air is 1:832. In wave driven air Turbine systems, there is a great loss of energy, because the air is first compressed by the wave before it can exert pressure and run the Turbine.

A number of prior art wave energy focusing devices have relied on planer reflection of the wave front and/or the wave front is channelled through a narrow opening so that the vertical displacement or amplitude of the wave is magnified. Some other focusing devices have various means to change the formation of the sea bed. This disrupts the wave propagation and the amplitude of the wave is maximized at a predetermined location.

In the surface followers that use floats or pitching devices, the floats or pitching devices are connected to ropes or cables and these in turn are connected either to pumps or to ratchet mechanisms so as to turn electrical generators when the floats are either rising or falling.

Also, the floats may drive hydraulic pumps or pistons and the kinetic energy is used to drive a turbine, Ex. Sea Power and Associates' wave Rider.

Underwater turbines capture the movement of the Ocean's currents and use this energy to drive slow moving blades. These in turn, power a generator like an underwater Wind Mill. Example:—Blue Energy's Davis Hydro Turbine.

Those devices having pulleys and cables near or below the water surface and connected to floats or paddles are subjected to the destructive and corrosive power of the sand and salt water. Continued back and forth movement of a cable through a pulley in an underwater environment will require frequent maintenance which may be very costly.

All the above technologies, involves a great amount of expenditure. In the near shore technologies, all the devices are placed on the floor of the sea and a great deal of the wave energy is lost to the floor of the sea. In deep seas, the floats or pitching devices are hooked to heavy weights at the bottom of the sea for their operation. The object of the present invention is to overcome all the disadvantages of the prior art and be a useful alternative thereof. Further, the units in this technology could be placed in deep seas without anchoring at the bottom of the sea for their functioning.

Each Unit of this wave energy convertor is deployed in the deep sea and is buoyant. The oscillatory movement of the waves is translated into a rotatory movement, so as to directly or indirectly drive a generator.

Thousands of these units may be deployed, side by side with or without any space between the units. All the mechanical energy from the units is brought to one point, to run a single large generator.

The British Patent GB1515744 discloses a device for utilizing Wave Energy. However it has not been tried practically and this patent does not work as desired for the following reasons:
 a) The two rack supports cannot freely slide the rack with gear teeth.
 b) The continuous side way forces acting on the float would bend the rack and disengage it from the gear wheel.
 c) The submerged spherical float would have wave energy acting equally on its upper and lower hemispheres. This would make the upward movement of the float with the wave, sluggish.
 d) The spherical float is free to rotate on its axis i.e., the rack. Thus the wave energy forces acting on the float would rotate and dislodge the gear teeth of the rack from the wheel gear.
 e) Gear box construction and its connection to a generator are not described.
 f) There is no provision for interconnecting hundreds or thousands of these devices to run a large generator.
 g) There is no mechanism described to produce grid quality power.

The U.S. Pat. No. 4,145,885 dated Mar. 27, 1979 discloses a device for utilizing Ocean Wave Energy. However, it has not been tried practically and this patent does not work as desired for the following reasons:
 a) The shape of the float is not ideal for movement and its movement would be sluggish.
 b) The rack alone supports the float and it would get bent due to the side way movement of the float. The rack needs to be very strong to prevent this and be of great length to accommodate high amplitude waves and tsunami waves. All these demand a sturdy and a very long rack which would add up to heavy weight and the float may not be able to lift the rack.

c) The rack would hit the ceiling due to high amplitude waves and tsunami waves.

d) The rack hinges to the transverse arm which is pivoted. The rack at its hinge with the transverse arm would move in an arc when the float is lifted and thus would get bent.

e) The gear wheel '42' needs to be of very great diameter to accommodate the movement of the rack.

f) The rack should have a spool behind it to keep it coupled to the pinion gear.

g) The rack is supported by cylindrical structures on either side of bar gear teeth of the rack. This would cause sluggish movement of the rack due to friction.

h) The civil construction has to withstand the waves.

i) There is no means to regulate the speed of the output shaft. This patent will not work as desired.

In the light of aforementioned discussion, there exists a need for systems and methods that can tap the unlimited energy present in the ocean waves for power generation. The present invention discloses systems and methods for power generation from waves in deep oceans. The entire unit of this invention can be deployed in deep sea where the pillar construction from the bottom of the sea is not possible. This ocean wave energy converter is competitive with fossil fuels and is useful for deployment in the deep seas, throughout the world, all through the year.

BRIEF SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Exemplary embodiments of the present disclosure are directed towards systems for power generation from waves in deep oceans. The system comprises of one or more rotational energy generation units and a power generation means. The oscillatory motion of the waves is converted into rotational energy for generating power. The rotational energy generation unit comprises of a neutrally buoyant tank, a buoyancy maintenance unit, a float, a supporting means, a platform, an actuator means and a rotational driving means. The buoyant tank is disposed at a predetermined depth under the ocean surface and is adapted to anchor the system. The buoyancy maintenance unit is connected to the buoyant tank and is adapted for maintaining the neutral buoyancy of the buoyant tank by balancing air and water in the buoyant tank. The float is disposed at the ocean surface and is adapted to float over the ocean surface. The supporting means extends upwardly from a top surface of the buoyant tank to a predetermined height above the ocean surface and confines the float slidably at the ocean surface. The platform is disposed at a predetermined height above the ocean surface and is mounted over the supporting means. The actuator means is coupled to a center of the float for converting a linear motion into a rotational motion. The rotational driving means comprises of a plurality of gears mounted on a plurality of shafts. The rotational driving means is mounted on a platform and is coupled to the actuator means by a first shaft. The power generation means is coupled to either a single rotational energy generation unit or multiple units by means of a power shaft. In a particular embodiment, the supporting means are four pillars and the actuator means are a rack and pinion system.

Other exemplary embodiments of the present subject matter are directed towards methods for power generation from waves in deep oceans. The method begins with the step of providing a system for power generation from waves in deep oceans as described in the previous paragraph. Here the oscillatory motion of the waves gets converted into a linear movement of the float. This is followed by converting the linear movement of the float into a linear motion of the rack. Then the linear motion of the rack is converted into a rotational motion of the pinion gear. This is followed by converting the rotational motion of the pinion gear into a rotational motion of the rotational driving means to generate a rotational energy. Finally, the rotational energy that is generated by the rotational driving means is transferred to the power generation means for generating power.

The objective of this invention is to provide an apparatus for harnessing the surface Ocean Wave Energy in deep seas, most efficiently.

Another object of the invention is to construct a Power Generating System that can be towed to the most appropriate location to tap maximum amount of Ocean Wave Energy.

One more object of the invention is to set up a power generating system expeditiously and economically.

Furthermore, another object of the invention is to place, all the power generating equipment like turbine, generator, electronic equipment, control panels etc, much above the corrosive sea water.

This Ocean Wave Energy conversion system has a low initial financial investment, and can be easily expanded to meet the rising demand for energy and also, requires very minimal maintenance.

Further, the novel feature of this invention, the object and advantages will be known, in part in the following detailed description and drawings and in part will become apparent upon examination by those skilled in the art or through practice of the invention.

BRIEF DESCRIPTION OF DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

According to different non limiting exemplary embodiments of the present disclosure, systems and methods for power generation from surface waves in deep oceans are disclosed. The apparatus for power generation from the surface ocean waves in deep seas several kilometers from the shore is a system for harnessing the energy of the ocean waves, to produce useful energy like electricity.

In accordance with a non limiting exemplary embodiment of the present subject matter, the system comprises of one or more rotational energy generation units and a power generation means. The oscillatory motion of the waves is converted into rotational movement for generating power. The rotational energy generation unit comprises of a neutrally buoyant tank, a buoyancy maintenance unit, a float, a supporting means, a platform, an actuator means and a rotational driving means. The buoyant tank is disposed at a predetermined depth under the ocean surface and is adapted to anchor the system. The buoyancy maintenance unit is connected to the buoyant tank and is adapted for maintaining the neutral buoyancy of the buoyant tank by balancing air and water in the buoyant tank. The float is disposed at the ocean surface and is adapted to float over the ocean surface. The supporting means extends upwardly from a top surface of the buoyant tank to a predetermined height above the ocean surface and confines the float slidably at the ocean surface. The platform is disposed at a predetermined height above the ocean surface and is mounted over the supporting means. The actuator means is coupled to a center of the float for converting a linear motion into a rotational motion. The rotational driving means comprises of a plurality of gears mounted on a plurality of shafts. The rotational driving means is mounted on a platform and is coupled to the actuator means by a first shaft. The power generation means is coupled to either a single rotational energy generation unit or multiple units by means of a power shaft. In single unit system, the second or the third shaft in the gear box serves as the power shaft.

According to a non limiting exemplary embodiment of the present disclosure, the system further comprises of a power regulating means adapted to regulate the speed of the power generation means. The power regulating means is coupled to the rotational driving means by a first end and the power generation means by a second end. In a particular embodiment, the power regulating means is a flywheel integrated with a brake system.

In accordance with a non limiting exemplary embodiment of the present disclosure, the buoyancy maintenance unit comprises of a centrifugal pump, a compressor tank with compressed air, an inlet pipe unit, an outlet pipe unit and an air pipe.

The centrifugal pump is positioned over the platform and is connected to the compressor tank which is also positioned over the platform. The compressed air in the compressor tank powers the centrifugal pump.

The inlet pipe unit has a first valved inlet pipe and a second valved inlet pipe. The top end of both the pipes is connected to the centrifugal pump. The bottom end of the first inlet pipe is connected to a lower portion of the water in the buoyant tank and the bottom end of the second inlet pipe is connected to the ocean.

The outlet pipe unit has a first valved outlet pipe and a second valved outlet pipe. The top end of both the pipes is connected to the centrifugal pump. The bottom end of the first outlet pipe is connected to the buoyant tank and the bottom end of the second outlet pipe is connected to the ocean.

A bottom end of the air pipe is connected to the upper portion of the buoyant tank with the air pipe extending upwardly to a predetermined height above the platform and birfurcating into a first valved air sub pipe and a second valved air sub pipe. The first valved air sub pipe is adapted for connecting the air in the buoyant tank to the atmospheric air and the second valved air sub pipe is adapted for connecting the compressed air in the compressor tank with the buoyant tank.

In different embodiments, the supporting means are multiple pillars. In a particular embodiment, the supporting means are four pillars and the actuator means are a rack and pinion system.

In accordance with a non limiting exemplary embodiment of the present disclosure, the rotational driving means has a first shaft mounted with a pair of freewheel gears, a second and a third shaft, both being mounted with a pair of wheel gears each. The shafts rotate on bearings. The freewheel gears are positioned in opposite direction to each other, so that one of the freewheel gear gets engaged with one of the wheel gears on either the second shaft or the third shaft in whichever direction the pinion is rotated. The unengaged wheel gear in the second shaft gets engaged with the unengaged wheel gear in the third shaft.

According to a non limiting exemplary embodiment of the present disclosure, the method for power generation includes the following steps. The method begins with the step of providing a system for power generation from waves in deep oceans as described in the previous paragraph. Here the oscillatory motion of the waves gets converted into a linear movement of the float. This is followed by converting the linear movement of the float into a linear motion of the rack. Then the linear motion of the rack is converted into a rotational motion of the pinion gear. This is followed by converting the rotational motion of the pinion gear into a rotational motion of the rotational driving means to generate a rotational energy. Finally, the rotational energy that is generated by the rotational driving means is transferred to the power generation means for generating power.

In a particular embodiment, wave energy moves a float, vertically up and down, within the confines of four vertical pillars that are fixed to the upper surface of the buoyant tank. This buoyant tank is placed about 60 feet deep below the ocean surface, where there is no pressure effect of the surface ocean waves on the buoyant tank. The upper surface of the float connects to a Rack. This Rack engages a pinion gear mounted on the horizontal shaft of a gearbox. Within the gearbox are free-wheels and gears, that drive a generator shaft, in one direction only, as the float oscillates up and down on the ocean waves. For generating large amounts of power, a number of floats are placed in a row. Many rows are placed side by side and the mechanical energy of all the rows is transferred to a long horizontal shaft which drives a generator. There are a number of arrangements to regulate the speed of the generator to get grid quality power. The term "gearbox" mentioned in this disclosure refers to a turbine that runs the generator.

Figure 1:
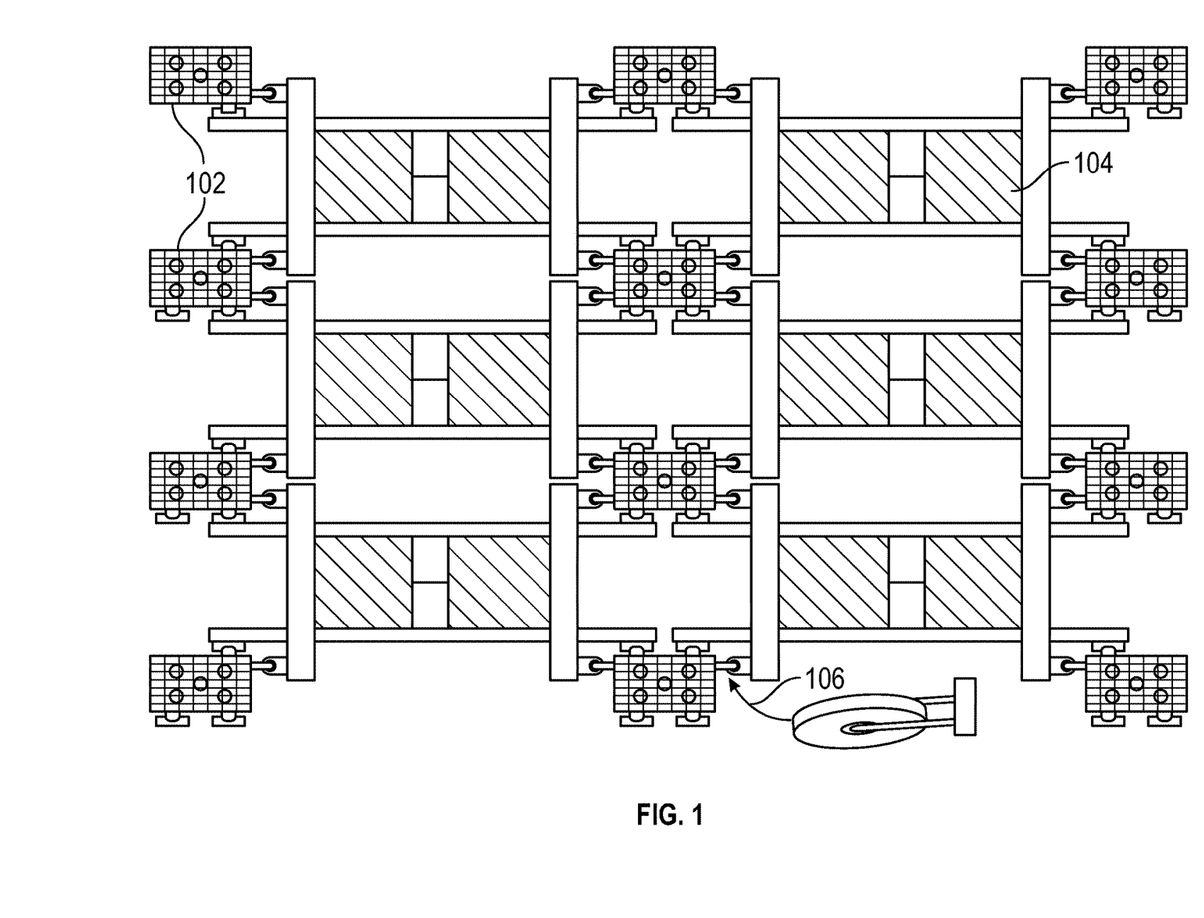
FIG. 1 is a schematic representation of a top view of multiple floats confined within pillars by means of sliding wheels, in accordance with a non limiting exemplary embodiment of the present disclosure.

Referring to FIG. 1, it shows the top view of multiple floats 104 of several units confined within pillars 102 by means of sliding wheels 106.

Figure 2:
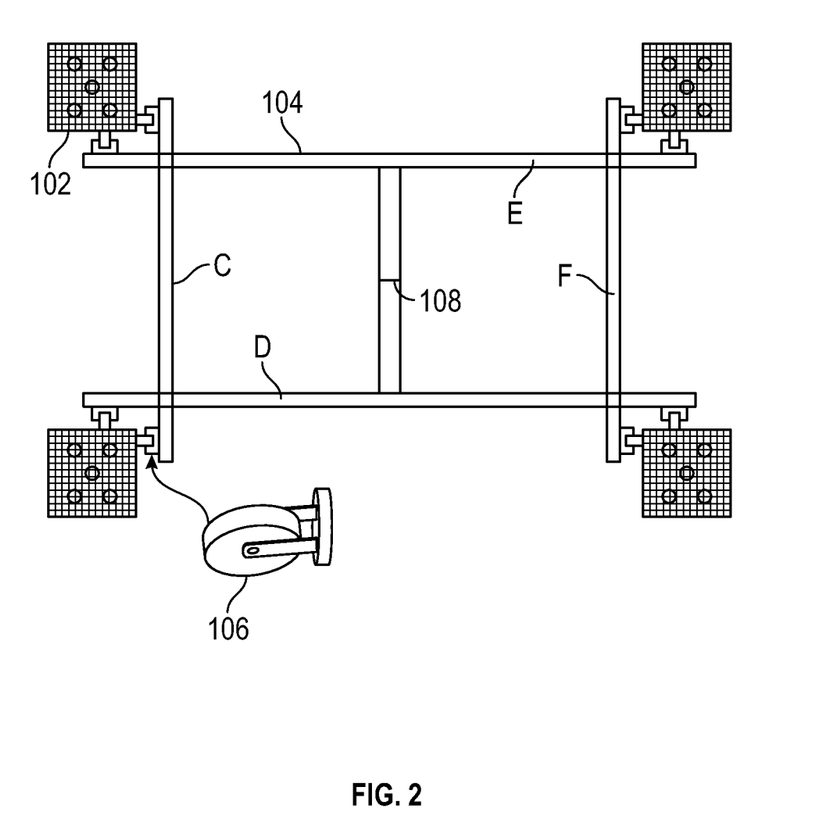
FIG. 2 is a schematic representation of a top view of a single float confined within four pillars by means of sliding wheels, in accordance with a non limiting exemplary embodiment of the present disclosure.

Referring to FIG. 2, it shows a top view of a single float 104 confined within four pillars 102 by means of sliding wheels 106. In the figure, CDEF represents the frame of the float and the figure further depicts the centre of gravity 108 of the upper surface of the float.

Figure 3:
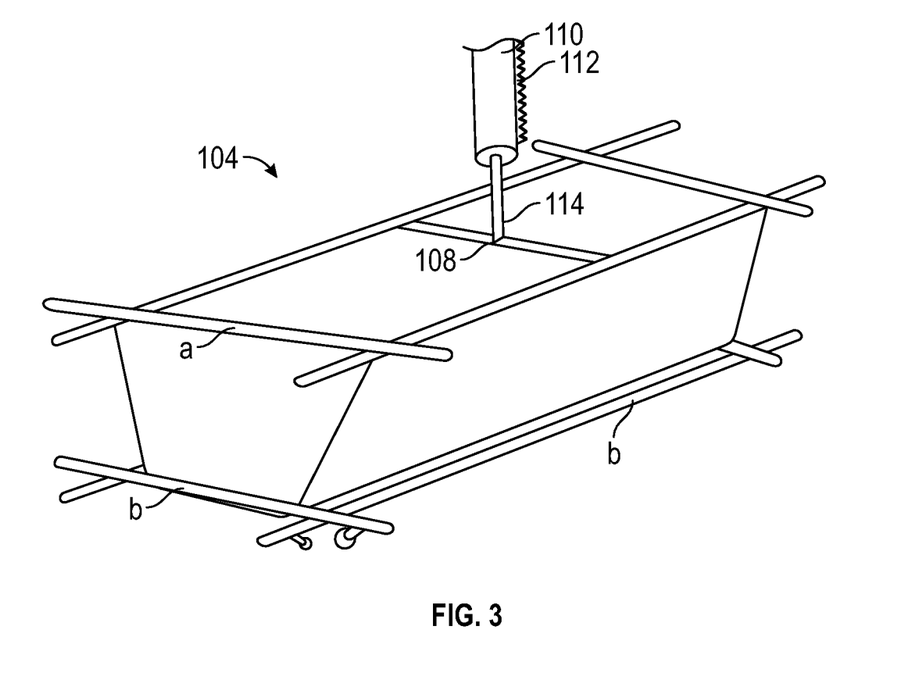
FIG. 3 is a schematic representation of an isometric view of a float with a rack attached to it by means of a connecting rod, in accordance with a non limiting exemplary embodiment of the present disclosure.

Referring to FIG. 3, it shows a float 104 with upper 'a' and, lower 'b' frames. The rack rod 110 and the rack 112 (bar with gear teeth) are connected to 'the centre of gravity' 108 of the upper surface of the float 104 by means of a connecting rod 114.

Figure 4:
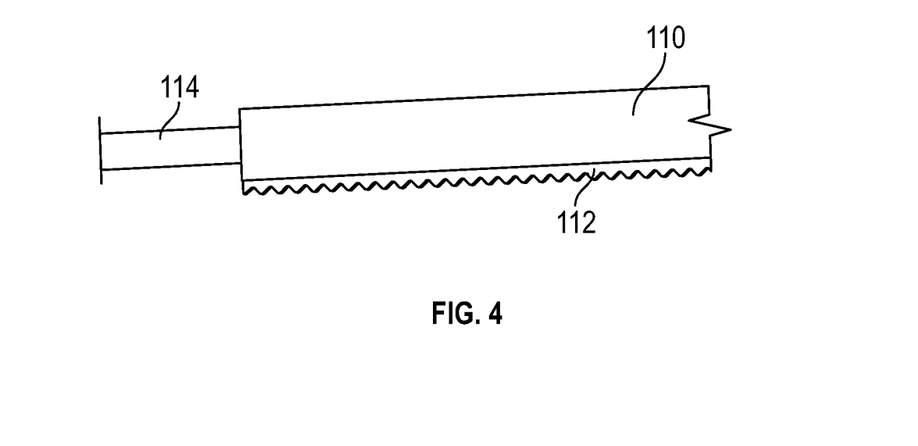
FIG. 4 is a schematic representation of a portion of the rack and the connecting rod, in accordance with a non limiting exemplary embodiment of the present disclosure.

Referring to FIG. 4, it shows a portion of the rack 112, rack rod 110 and the connecting rod 114 that connects the rack rod to the upper surface of the float.

Figure 5:
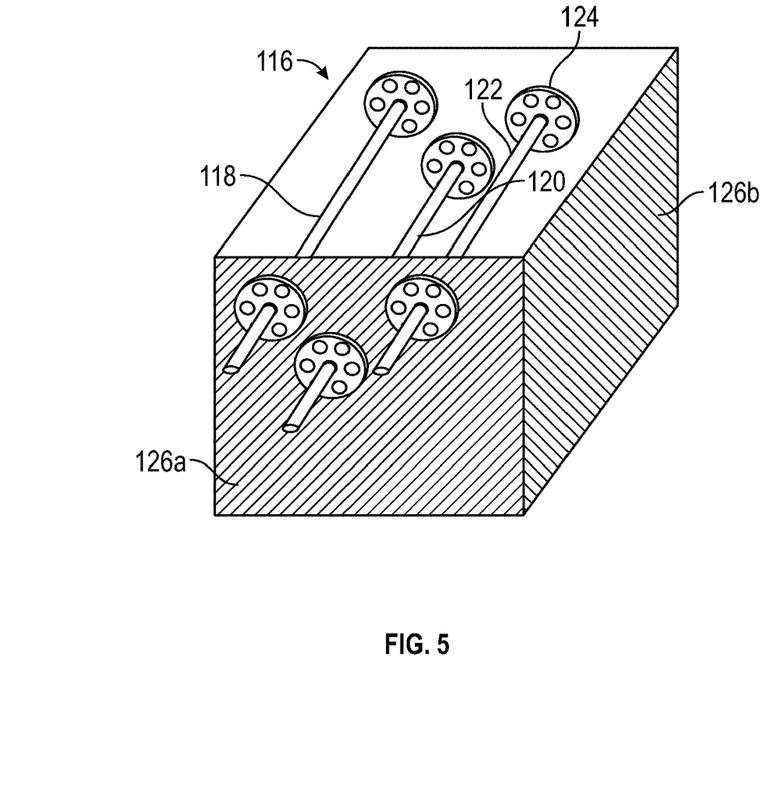
FIG. 5 is a schematic representation of an isometric view of a gearbox, in accordance with a non limiting exemplary embodiment of the present disclosure.

Referring to FIG. 5, it depicts a gearbox 116 with a first shaft 118, a second shaft 120 and a third shaft 122 on bearings 124. Gears on the shafts are not shown for simplistic representation. The gear box is made of gear box plates 126.

Figure 6:
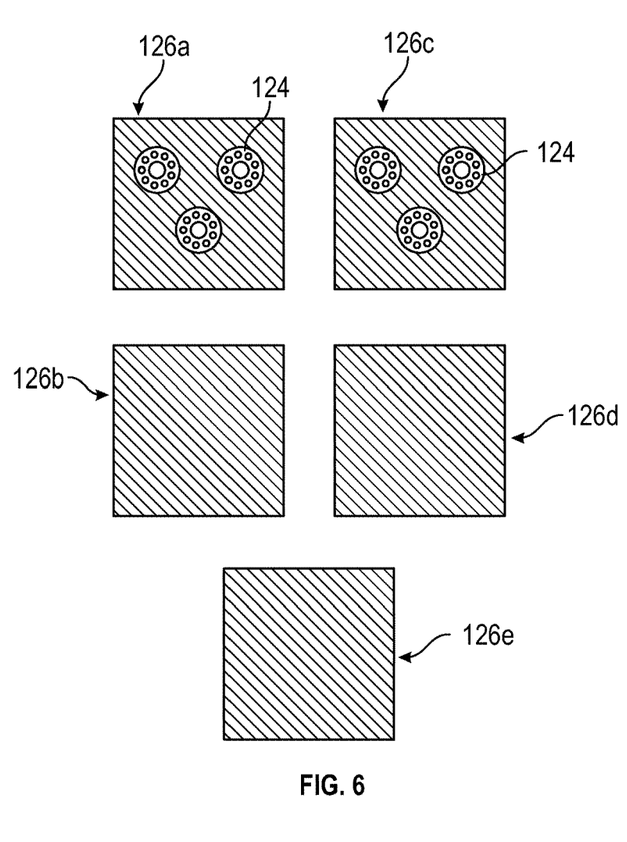
FIG. 6 is a schematic representation of the side plates and bearings of the gearbox, in accordance with a non limiting exemplary embodiment of the present disclosure.

Referring to FIG. 6, it depicts the side plates and bearings of the gearbox. 126a and 126c represent identical and opposite plates with bearings 124. 126b and 126d represent identical and opposite plates without bearings. 126e represents the bottom plate of the gearbox.

Figure 7:
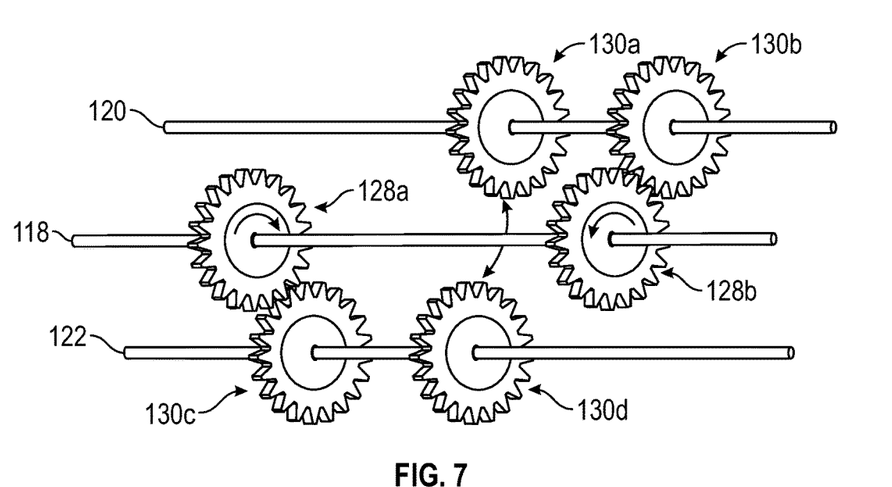
FIG. 7 is a schematic representation of the arrangement of the geared freewheels and gears inside the gearbox, in accordance with a non limiting exemplary embodiment of the present disclosure.

Referring to FIG. 7, it represents the arrangement of the gears inside the gearbox. 128a and 128b represent freewheels with similar size gears. 130a, b, c and d represent wheel gears similar in size to the gears present on the freewheels. The freewheel gears 128a and 128b are mounted on the first shaft 118. The wheel gears 130a and b are mounted on the second shaft 120. The wheel gears 130c and d are mounted on the third shaft 122.

Figure 8:
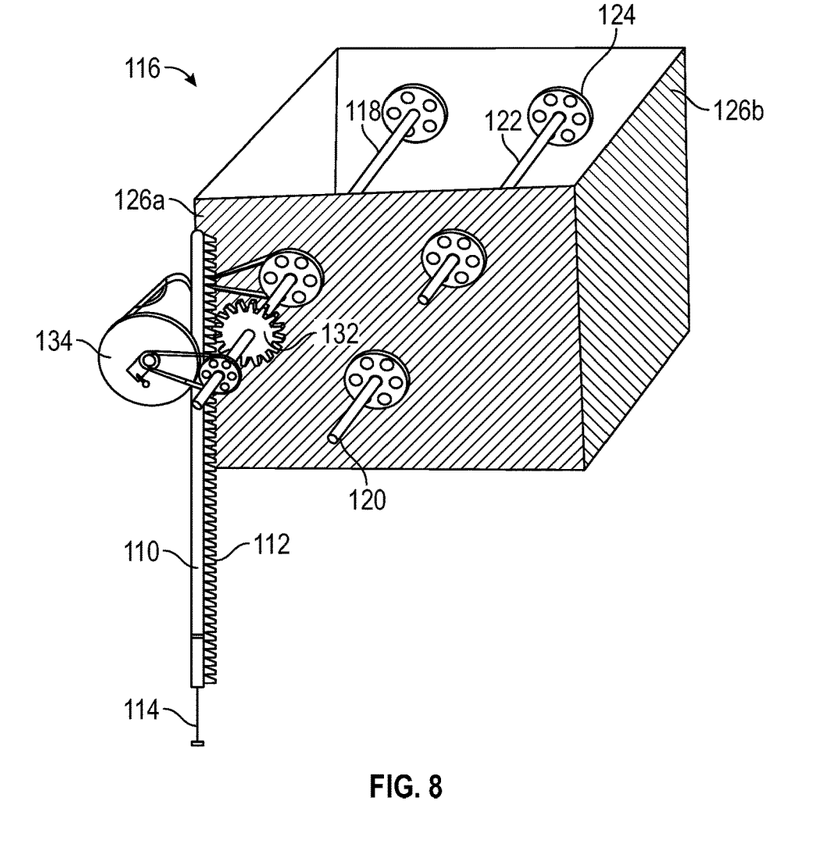
FIG. 8 is a schematic representation of an isometric view of the gearbox showing the rack and pinion mechanism, in accordance with a non limiting exemplary embodiment of the present disclosure.
Figure 9:
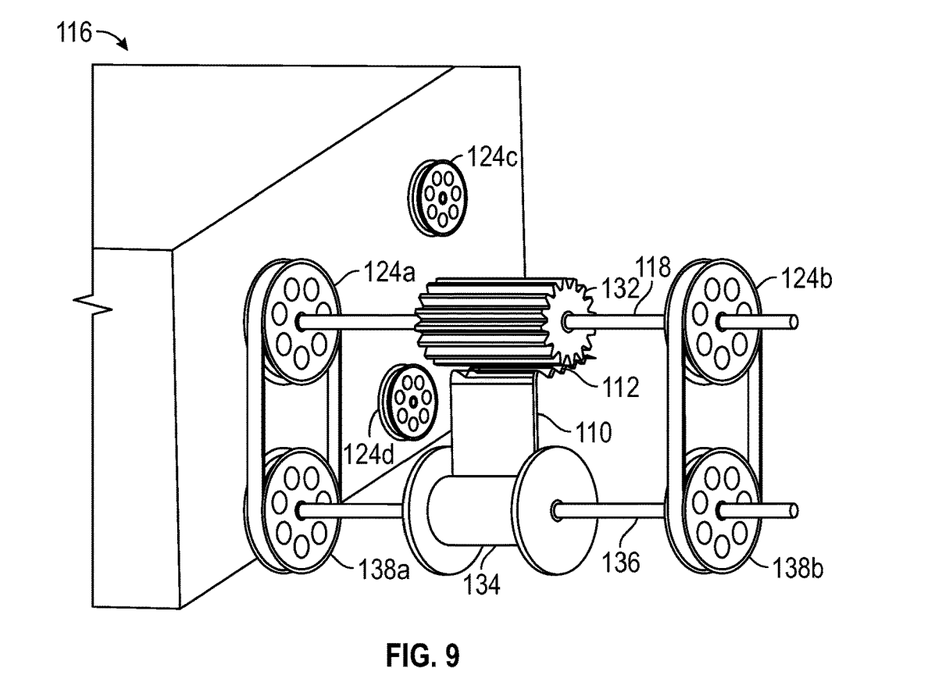
FIG. 9 is a schematic representation of a top view of the rack and pinion mechanism being coupled with a first shaft of the gearbox, in accordance with a non limiting exemplary embodiment of the present disclosure.

Referring to FIGS. 8 and 9, they show the coupling of the rack and pinion system with the gearbox 116. The rack 112 engages the pinion gear 132 that is mounted on the first shaft 118. A spool 134 mounted on a spool shaft 136 supports the rack 112 from behind preventing its disengagement from the pinion gear 132. The spool shaft 136 rotates on bearings 138a and b that are fixed at equidistance to the bearings 124a and b of the first shaft 118.

Figure 10:
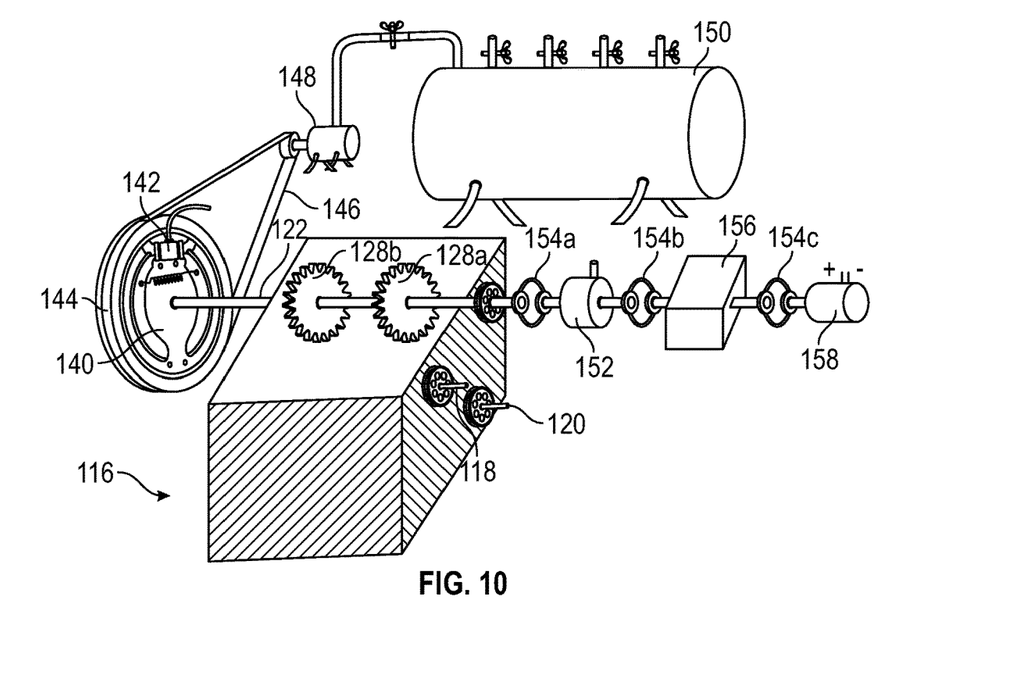
FIG. 10 is a schematic representation of a part of the power generation system showing the arrangement of the gearbox, power generation means and the power regulation means, in accordance with a non limiting exemplary embodiment of the present disclosure.

Referring to FIG. 10, it represents a part of the power generation system showing the arrangement of the gearbox, power generation means and the power regulation means. The gearbox 116 (all shafts and gears are not shown) with shaft 122, fly wheel 140, the brake system 142, the pulley groove 144, pulley 146, compressor motor 148, compressor tank 150, motor that runs on compressed air 152, couplings 154a, b and c, multiplication gearbox 156 and the generator 158 are also represented in the figure.

Figure 11:
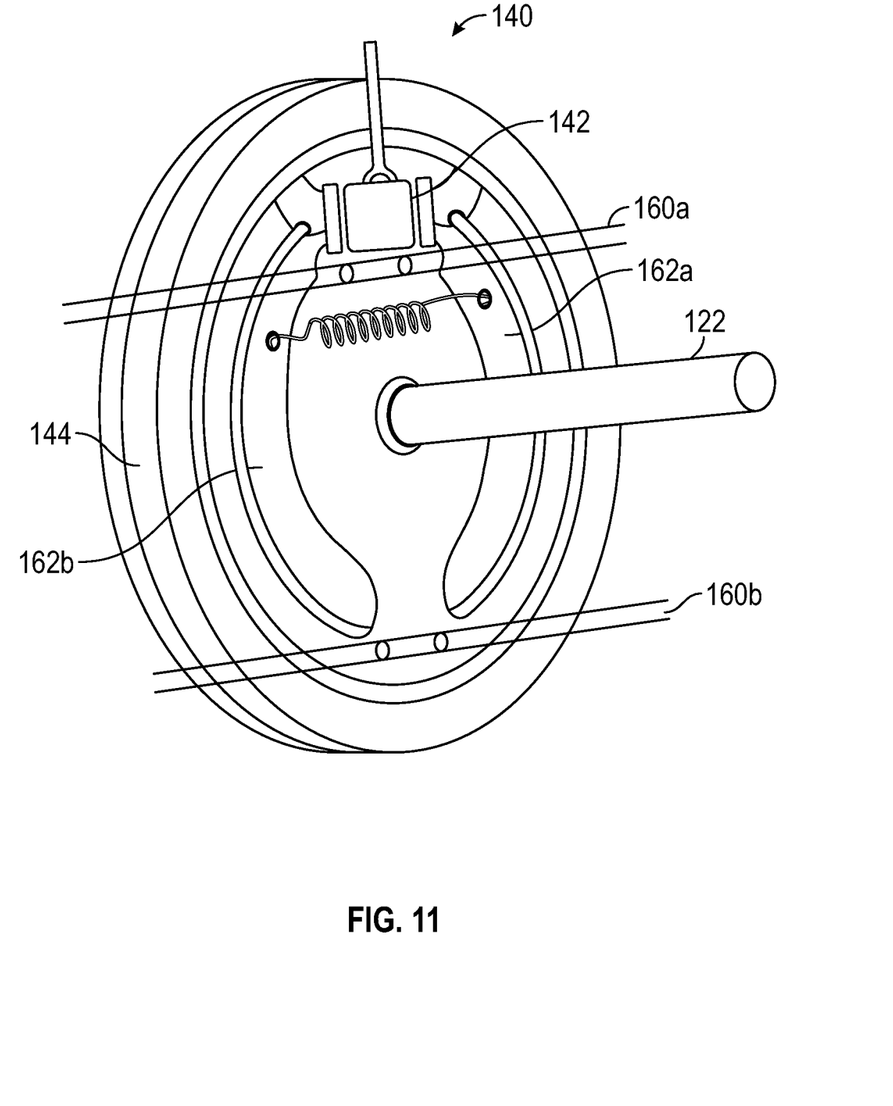
FIG. 11 is a schematic representation of a flywheel integrated with a brake system, in accordance with a non limiting exemplary embodiment of the present disclosure.

Referring to FIG. 11, it shows the flywheel 140 on shaft 122, pulley groove 144, brake system 142 with brake shoes 162a and b. The figure also shows the supports 160a and b that support the brake system 142 of the flywheel 140.

Figure 12:
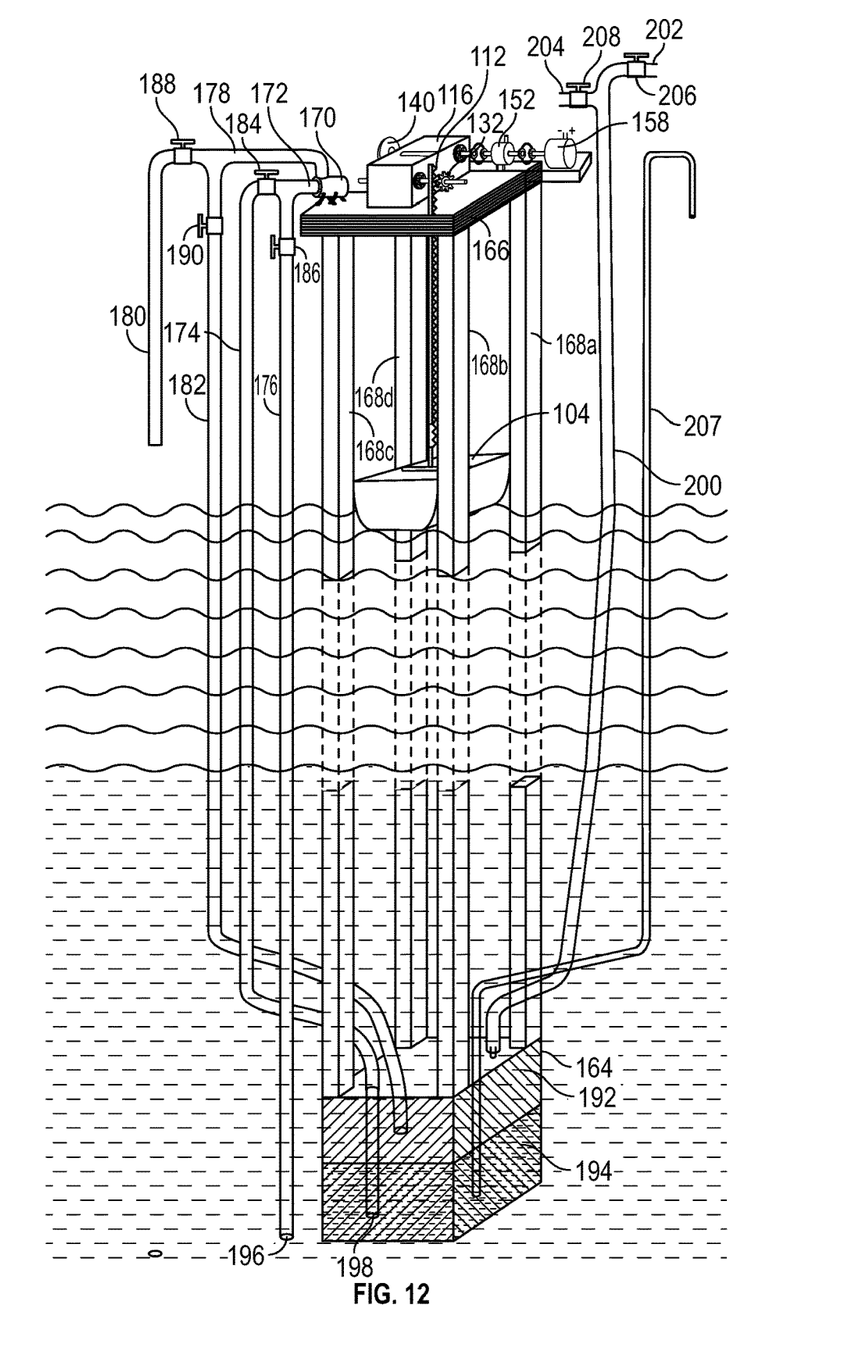
FIG. 12 is a schematic representation of a single unit power generation system, in accordance with a non limiting exemplary embodiment of the present disclosure.

Referring to FIG. 12, it shows a single unit power generation system. The platform 166 above the ocean waves is supported by four pillars 168a, b, c and d that stand fixed to the buoyant tank 164. The float 104 with the rack 112 and pinion 132, the flywheel 140, motor that runs on compressed air 152 and the generator 158. The centrifugal pump 170 with the inlet pipe unit 172 and the outlet pipe unit 178 are also shown. The inlet pipe unit 172 bifurcates into first and second valved inlet pipe 174 and 176 and the outlet pipe unit 178 bifurcates into first and second valved outlet pipe 180 and 182. The pairs of valves 'P' 188, 'Q' 184 and 'R' 190, 'S' 186 pump water 194 in and out from the buoyant tank 164. The pipe valves, M 196 valve and N 198 valve are the foot-valves of pipes 176 and 174 respectively. The air pipe 200 connects the buoyant tank 164 and bifurcates into first and second valved air sub pipes 202 and 204. The pipes 202 and 204 have valves Y 206 and Z 208 respectively on them. The pipe 204 connects to the compressor tank and the pipe 202 connects to the atmospheric air.

Figure 13:
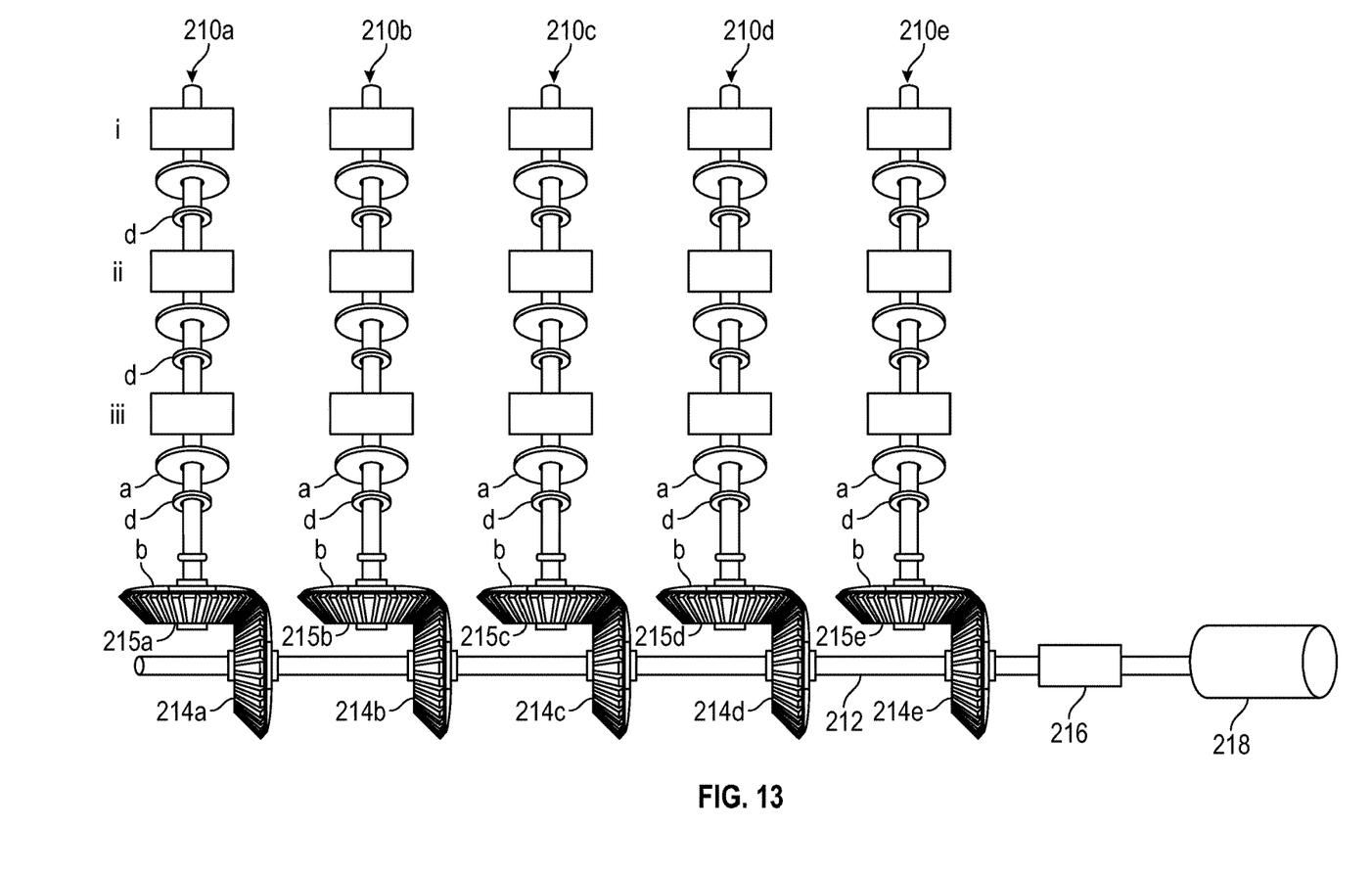
FIG. 13 is a schematic representation of a top view of multiple units of the power generation system, in accordance with a non limiting exemplary embodiment of the present disclosure.

Referring to FIG. 13, it shows multiple units of the power generation system. Rotational energy generation units 210a-e are connected to the power shaft 212, by the 45° bevel gears 214a-e and 215a-e which are connected to the multiplication gearbox 216 and generator 218.

The present invention is further explained in detail henceforth. Each float 104 is guided to move vertically up and down within the confines of four vertical pillars 168a, b, c and d which are fixed to the buoyant tank 164, as shown in the FIG. 12. This buoyant tank 164 is placed, deep below the ocean surface, where there is no pressure effect of the surface ocean waves on the buoyant tank. Numerically this depth at which there is no pressure effect of the surface ocean waves on the buoyant tank 164 is more than half the maximum wave length of the surface ocean waves. It is generally, at over a depth of 60 feet from the ocean surface.

To keep the buoyant tank 164 level at any set depth, a balance of air 192 and water 194 in the buoyant tank is maintained so that, its overall density is equal to the surrounding water (i.e. neutral buoyancy is maintained).

A centrifugal pump 170 that runs on the compressed air from a compressor tank 150 (FIG. 10) is placed on the platform 166.

The inlet pipe unit 172 of the centrifugal pump 170 bifurcates into first and second valved inlet pipes 174 and 176 having valves Q 184 and S 186 respectively on them. The pipe 174 goes to the bottom of the buoyant tank and has a foot valve N 198 on it. The pipe 176 goes into the sea water and has a foot valve M 196 on it.

The outlet pipe unit 178 of the centrifugal pump 170 bifurcates into first and second valved outlet pipes 180 and 182 having valves P 188 and R 190 respectively on them. The pipe 182 goes into the buoyant tank 164 and the pipe 180 lets out water into the sea.

The air pipe 200 connecting the buoyant tank 164, bifurcates into first and second valved air sub pipes 202 and 204 at about the height of the platform 166. The pipes 202 and 204 have valves Z 206 and Y 208 respectively on them.

The water pipe 207 runs from the bottom of the buoyant tank 164 and at about the level of the platform 166, opens out to the sea to let out the water 194, as may be required.

The pipe 202 connects the air in the buoyant tank 164 to the atmospheric air, when the valve Z 206 is opened and the valve Y 208 is closed. Sea water is pumped into the buoyant tank 164 by the centrifugal pump 170, when the valves P 188 and Q 184 are closed and the valves R 190 and S 186 are opened. Likewise, sea water is pumped out of the buoyant tank 164 when the valves P 188 and Q 184 are opened and the valves R 190 and S 186 are closed. The centrifugal pump 170 functions when the air 192 in the buoyant tank 164 is in contact with the atmospheric air by the pipe 202. The pipe 204 connects the compressor tank 150 (FIG. 10) with the buoyant tank 164.

When the valve Z 206 is closed and the valve Y 208 is opened, the water 194 in the buoyant tank 164 is forced out by the pressurized air from the compressor tank 150 and comes out through the water pipe 207.

With reference to the gear box, as shown in FIG. 7, the first shaft 118 has two freewheels with gears 128a and b placed on the shaft, in reverse or opposite directions, so that, in whichever direction the first shaft 118 is rotated, the shaft 118 gets engaged to one of the two freewheels 128a and b. Gears of same size are mounted on the freewheels 128a and b. One freewheel with its gear 128b engages a wheel gear 130b on a second shaft 120. This wheel gear 130b is of the same size as that of the mounted gear on the free wheel 128b. This second shaft 120, also has another wheel gear 130a which is of the same size as that of the gear 130b.

The second freewheel with its mounted gear 128a engages a wheel gear 130c on a third shaft 122. This wheel gear 130c on the shaft 122 is of the same size as that of the mounted gear on the freewheel 128a. This third shaft 122 also has another wheel gear 130d which is of the same size as that of the wheel gear 130c.

The two wheel gears 130a and 130d on the second shaft 120 and the third shaft 122 respectively, engage each other, as shown by the arrows in the FIG. 7. The sizes of the wheel gears on the three shafts may also be such that, they engage one another, and all the three shafts moving on ball bearings, move in unison.

All the three shafts 118, 120 and 122 with their free wheel gears and wheel gears, moving on ball bearings as seen in FIGS. 7 and 8 are placed in the gearbox 116 and are lubricated by a gear oil (in the FIG. 8 the freewheel gears and wheel gears are not shown).

Thus in whichever direction, the first shaft 118 having the freewheels with gears 128a and b is moved, the second and third shafts 120 and 122 respectively, also move.

When a number of units are placed, one behind the other in a row, the second shaft of the first unit connects with the corresponding second shaft of the unit behind or the third shaft of the first unit connects with the corresponding third shaft of the unit behind. Here, the same incident wave, after lifting the first float, lifts the second float behind and the third float behind the second float etc., till all the energy contained in the incident wave, is used up in lifting the floats. The floats may be placed one immediately behind the other or at some distance between them. A number of rows of floats i.e. units may be placed side by side on the surface of the deep seas and all their mechanical energy transferred to a long horizontal shaft, placed at 90° to the rows of units.

As seen in FIG. 10, on the second shaft 120, or on the third shaft 122 (in the picture, the third shaft 122 is shown), is fixed a fly wheel 140, on one side of the gear box 116. This fly wheel 140 has a brake system 142 on it to slow its speed, as and when needed to regulate the speed of the generator 158. This brake system 142 is connected to the compressor tank 150 at its outlet. The flywheel 140 also has a pulley groove 144 for a pulley belt 146 that runs the compressor motor 148 to pressurize the air or liquid in the compressor tank 150.

On the other side of the gear box 116, on the same shaft 122, that has Flywheel 140, is placed a motor 152 that runs on the compressed air or fluid from the compressor tank 150 from another outlet, so as to turn the shaft 122, in the same direction, as that of its rotation.

a) The brake system on the fly-wheel 140 that is connected to the compressor tank 150 from another outlet, for its functioning, and b) The motor 152 which is on the same shaft 122, as that of the flywheel 140, and is powered by the compressor tank 150 from another outlet, for increasing, the speed of the shaft, if needed, are connected through a computer system or a mechanical regulating system, to regulate the speed of the generator to get grid quality power.

The mechanical energy from a single unit may be used to run a small generator and grid quality power obtained, by the computer or mechanical regulation of the brake system 142 and the motor 152.

The mechanical energy of a number of units, of a row may be used to run a bigger generator. Here the brake system 142 and the motor 152 placed on each of the unit are regulated by the computer or mechanical regulating system, to get grid quality power.

The mechanical energy of all the rows may be utilized to run a very large generator as follows: As seen in FIG. 13, a long horizontal shaft 212 is placed at 90° and is engaged by 45° bevel gears 214 on it, to the 45° bevel gears 215 on the shafts of the last units of the rows of units 210a-e etc. Thus all the power of the rows of units 210a-e etc., is transferred to the long horizontal shaft 212. This horizontal shaft 212 is connected to a gear box 216. An electric generator 218, is connected to the gearbox 116. Through a computer system or through a mechanical regulating system, the speed of the generator, is regulated, to get grid quality power.

It is to be noted that multiplication gear boxes are used to run the generator and the second or the third shaft in a single unit may be used to run the multiplication gear box. In a multiple unit, the horizontal shaft or the power shaft is used to run the multiplication gear box.

Although, 'the ocean wave energy conversion system, (i.e. in the open, deep and far out in the sea), and the method of using the same, according to the present invention has been described in the foregoing specification with considerable details, it is to be understood that modifications may be made to the invention, which do not exceed the scope of the appended claims and modified forms of the present invention done by others skilled in the art to which the invention pertains will be considered infringements of this invention, when those modified forms fall within the claimed scope of this invention.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

I claim:

1. A system for power generation from waves in deep oceans comprising:
   a) at least one of a rotational energy generation unit, wherein the unit comprises of
      i) a neutrally buoyant tank being disposed at a predetermined depth under an ocean surface and adapted to anchor the system;
      ii) a buoyancy maintenance unit being connected to the buoyant tank and adapted for maintaining the neutral buoyancy of the buoyant tank by balancing air and water in the buoyant tank;
      iii) a float disposed at the ocean surface and adapted to float over the ocean surface;
      iv) a supporting means extending upwardly from a top surface of the buoyant tank to a predetermined height above the ocean surface, the supporting means thereof slidably confining the float at the ocean surface;
      v) a platform being disposed at a predetermined height above the ocean surface, the platform thereof being mounted over the supporting means;
      vi) an actuator means coupled to a center of the float for converting a linear motion into a rotational motion; and
      vii) a rotational driving means comprising a plurality of gears mounted on a plurality of shafts, the rotational driving means thereof being mounted on the platform and being coupled to the actuator means by a first shaft; and
   b) a power generation means being coupled to at least one of the rotational driving means by means of a power shaft.

2. The system as claimed in claim 1, wherein the system further comprises of a power regulating means having a first end and a second end, the power regulating means thereof being coupled to the rotational driving means at the first end and the power generation means at the second end, the power regulating means being adapted to regulate the speed of the power generation means.

3. The system as claimed in claim 1, wherein the buoyancy maintenance unit comprises of:
   a) a centrifugal pump being positioned over the platform;
   b) a compressor tank with compressed air, the compressor tank being positioned over the platform and connected to the centrifugal pump and powering the centrifugal pump;
   c) an inlet pipe unit comprising a first valved inlet pipe and a second valved inlet pipe, the first valved inlet pipe having a top end and a bottom end, the top end being connected to the centrifugal pump and the bottom end being connected to a lower portion of the tank, the second valved inlet pipe having a top end and a bottom end, the top end being connected to the centrifugal pump and the bottom end being connected to the ocean;
   d) an outlet pipe unit comprising a first valved outlet pipe and a second valved outlet pipe, the first valved outlet pipe having a top end and a bottom end, the top end being connected to the centrifugal pump and the bottom end being connected to the tank, the second valved outlet pipe having a top end and a bottom end, the top end being connected to the centrifugal pump and the bottom end being connected to the ocean;
   e) an air pipe having a top end and a bottom end, the bottom end being connected to an upper portion of the buoyant tank, the air pipe extending upwardly therefrom, the top end extending up to a predetermined height above the platform and bifurcating into a first valved air sub pipe and a second valved air sub pipe, the first valved air sub pipe adapted for connecting the air in the tank to the atmospheric air, the second valved air sub pipe adapted for connecting the compressor tank with the buoyant tank; and
   f) a water pipe having a top end and a bottom end, the bottom end being connected to a lower portion of the buoyant tank, the top end extending therefrom to a predetermined height above the ocean surface, the water pipe thereof being configured to let out the water from the buoyant tank.

4. The system as claimed in claim 1, wherein the supporting means comprises of a plurality of pillars.

5. The system as claimed in claim 1, wherein the actuator means comprises of a rack and a pinion, the rack being connected to the center of the float by means of a connecting rod and the pinion being connected to the first shaft.

6. The system as claimed in claim 5, wherein the rotational driving means comprises of the first shaft being mounted with a pair of freewheel gears, a second shaft being mounted with a pair of wheel gears, a third shaft being mounted with a pair of wheel gears, the first, second and third shafts being rotated on bearings, the freewheel gears being positioned in opposite direction to each other so that one of the freewheel gear gets engaged with one of the wheel gears on either the second shaft or the third shaft in whichever direction the pinion is rotated and the unengaged wheel gear in the second shaft being adapted to engage with the unengaged wheel gear in the third shaft.

7. The system as claimed in claim 1, wherein the power regulating means comprises of a fly wheel integrated with a brake system and a compressor motor that runs on compressed air to power the shaft in its direction of rotation.

8. A method for power generation from waves in deep oceans comprising:
   A) providing a system for power generation from waves in deep oceans, wherein the system comprises of
   a) at least one of a rotational energy generation unit, wherein the unit comprises of:
      i) a neutrally buoyant tank being disposed at a predetermined depth under an ocean surface and adapted to anchor the system, ii) a buoyancy maintenance unit being connected to the buoyant tank and adapted for maintaining the neutral buoyancy of the buoyant tank by balancing air and water in the buoyant tank,
iii) a float disposed at the ocean surface and adapted to float over the ocean surface,
iv) a supporting means extending upwardly from a top surface of the buoyant tank to a predetermined height above the ocean surface, the supporting means thereof slidably confining the float at the ocean surface,
v) a platform being disposed at a predetermined height above the ocean surface, the platform thereof being mounted over the supporting means,
vi) a rack and a pinion system coupled to a center of the float for converting a linear motion into a rotational motion, and
vii) a rotational driving means comprising a plurality of gears mounted on a plurality of shafts, the rotational driving means thereof being mounted on the platform and being coupled to the actuator means by a first shaft, and
b) a power generation means being coupled to at least one of the rotational driving means by means of a power shaft,
wherein an oscillatory motion of the waves gets converted into a linear movement of the float;
B) converting the linear movement of the float into a linear motion of the rack;
C) converting the linear motion of the rack into a rotational motion of the pinion gear;
D) converting the rotational motion of the pinion gear into a rotational motion of the rotational driving means to generate a rotational energy; and
E) transferring the rotational energy generated by the rotational driving means to the power generation means for generating power.

9. The method as claimed in claim 8, wherein the buoyancy maintenance unit comprises of:
 a) a centrifugal pump being positioned over the platform;
 b) a compressor tank with compressed air, the compressor tank being positioned over the platform and connected to the centrifugal pump and powering the centrifugal pump;
 c) an inlet pipe unit comprising a first valved inlet pipe and a second valved inlet pipe, the first valved inlet pipe having a top end and a bottom end, the top end being connected to the centrifugal pump and the bottom end being connected to a lower portion of the tank, the second valved inlet pipe having a top end and a bottom end, the top end being connected to the centrifugal pump and the bottom end being connected to the ocean;
 d) an outlet pipe unit comprising a first valved outlet pipe and a second valved outlet pipe, the first valved outlet pipe having a top end and a bottom end, the top end being connected to the centrifugal pump and the bottom end being connected to the tank, the second valved outlet pipe having a top end and a bottom end, the top end being connected to the centrifugal pump and the bottom end being connected to the ocean;
 e) an air pipe having a top end and a bottom end, the bottom end being connected to an upper portion of the buoyant tank, the air pipe extending upwardly therefrom, the top end extending up to a predetermined height above the platform and bifurcating into a first valved air sub pipe and a second valved air sub pipe, the first valved air sub pipe adapted for connecting the air in the tank to the atmospheric air, the second valved air sub pipe adapted for connecting the compressor tank with the buoyant tank; and
 f) a water pipe having a top end and a bottom end, the bottom end being connected to a lower portion of the buoyant tank, the top end extending therefrom to a predetermined height above the ocean surface, the water pipe thereof being configured to let out the water from the buoyant tank.

10. The method as claimed in claim 8, wherein the rotational driving means comprises of the first shaft being mounted with a pair of freewheel gears, a second shaft being mounted with a pair of wheel gears, a third shaft being mounted with a pair of wheel gears, the first, second and third shafts being rotated on bearings, the freewheel gears being positioned in opposite direction to each other so that one of the freewheel gear gets engaged with one of the wheel gears on either the second shaft or the third shaft in whichever direction the pinion is rotated and the unengaged wheel gear in the second shaft being adapted to engage with the unengaged wheel gear in the third shaft.

\* \* \* \* \*